US011185094B2

(12) United States Patent
Willcocks et al.

(10) Patent No.: US 11,185,094 B2
(45) Date of Patent: Nov. 30, 2021

(54) EXTRUDER SYSTEM AND METHOD

(71) Applicants: Mars, Incorporated, McLean, VA (US); Neil Willcocks, McLean, VA (US); Bruce Keen, McLean, VA (US); Keith Chisholm, McLean, VA (US); James Suttle, McLean, VA (US)

(72) Inventors: Neil Willcocks, McLean, VA (US); Bruce Keen, McLean, VA (US); Keith Chisholm, McLean, VA (US); James Suttle, McLean, VA (US)

(73) Assignee: Mars, Incorporated, McLean, VA (US)

( * ) Notice: Subject to any disclaimer, the term of this patent is extended or adjusted under 35 U.S.C. 154(b) by 330 days.

(21) Appl. No.: 14/776,338

(22) PCT Filed: Mar. 13, 2014

(86) PCT No.: PCT/US2014/025138
§ 371 (c)(1),
(2) Date: Sep. 14, 2015

(87) PCT Pub. No.: WO2014/151161
PCT Pub. Date: Sep. 25, 2014

(65) Prior Publication Data
US 2016/0037802 A1  Feb. 11, 2016

Related U.S. Application Data

(60) Provisional application No. 61/789,760, filed on Mar. 15, 2013.

(51) Int. Cl.
*A23K 40/25*  (2016.01)
*A23N 17/00*  (2006.01)
(Continued)

(52) U.S. Cl.
CPC .............. *A23K 40/25* (2016.05); *A23K 40/20* (2016.05); *A23K 50/40* (2016.05); *A23N 17/005* (2013.01);
(Continued)

(58) Field of Classification Search
CPC .. A23L 1/0128; A23V 2002/00; A47J 37/041; A47J 37/0629; F24C 15/164;
(Continued)

(56) References Cited

U.S. PATENT DOCUMENTS 3,409,940 A  11/1968 Ovtcharenko
3,813,082 A   5/1974 Manser
(Continued)

FOREIGN PATENT DOCUMENTS

CN      2057138      5/1990
CN    101878949    11/2010
(Continued)

OTHER PUBLICATIONS

Pyle, Fryer, Reilly (eds.), Chemical Engineering for the Food Industry, Mixing in Food Processing, pp. 424-425 (1997).

*Primary Examiner* — Drew E Becker
*Assistant Examiner* — Austin Parker Taylor
(74) *Attorney, Agent, or Firm* — Mars, Incorporated

(57) ABSTRACT

Apparatus and methods for producing multiple extruded products having different characteristics from the extruded stream of a single main extruder are provided. A satellite extruder assembly is removably attached to a main extruder allowing for the production of a plurality of different extrusion products from a single stream from one main extruder that is divided into multiple streams channeled to a plurality of satellite extruders. Each of the extruders may be operated at different temperature, pressure, moisture and shear con-
(Continued)

ditions. Additional components may be selectively added to one or more of the material streams.

5 Claims, 2 Drawing Sheets

(51) Int. Cl.
    *A23K 40/20*         (2016.01)
    *A23K 50/40*         (2016.01)
    *A23P 30/34*         (2016.01)
    *A23P 30/20*         (2016.01)
    *B29C 48/025*        (2019.01)
    *B29C 48/92*         (2019.01)
    *B29C 48/385*        (2019.01)

(52) U.S. Cl.
    CPC ............... *A23P 30/20* (2016.08); *A23P 30/34* (2016.08); *B29C 48/0255* (2019.02); *B29C 48/385* (2019.02); *B29C 48/92* (2019.02); *B29C 2948/92714* (2019.02); *B29C 2948/92723* (2019.02)

(58) Field of Classification Search
    CPC ......... F24C 7/087; A23K 40/20; A23K 40/25; A23K 50/40; A23P 30/20; A23P 30/34; B29C 48/92; B29C 48/0255; B29C 48/385; B29C 2948/92723; B29C 2948/92714; A23N 17/005
    USPC .......................................................... 426/516
    See application file for complete search history.

(56) References Cited

U.S. PATENT DOCUMENTS

| | | | |
|---|---|---|---|
| 3,817,675 A | 6/1974 | Maiocco | |
| 4,684,488 A | 8/1987 | Rudolph | |
| 4,900,572 A | 2/1990 | Repholz et al. | |
| 5,048,405 A | 9/1991 | Sarukawa et al. | |
| 5,486,049 A | 1/1996 | Boatman et al. | |
| 5,694,833 A | 12/1997 | Wenger | |
| 5,776,534 A * | 7/1998 | Christensen | A21C 11/163 264/176.1 |
| 5,891,502 A | 4/1999 | Heck et al. | |
| 5,919,509 A | 7/1999 | Cremers et al. | |
| 5,939,124 A | 8/1999 | Wenger | |
| 6,190,591 B1 | 2/2001 | Van Lengerich | |
| 6,294,212 B1 | 9/2001 | Huber et al. | |
| 6,719,448 B2 | 4/2004 | Tedman et al. | |
| 6,866,171 B2 | 3/2005 | Ickinger | |
| 7,416,096 B2 | 8/2008 | Maguire | |
| 7,754,124 B2 | 7/2010 | Spruell | |
| 8,794,949 B2 | 8/2014 | Simpson et al. | |
| 2006/0025381 A1 | 2/2006 | Brown et al. | |
| 2006/0057266 A1 | 3/2006 | Meyer et al. | |
| 2007/0128234 A1* | 6/2007 | Subramaniam | A23G 4/06 424/401 |
| 2007/0137502 A1 | 6/2007 | Fornaguera | |
| 2010/0260882 A1 | 10/2010 | Kearns et al. | |

FOREIGN PATENT DOCUMENTS

| | | |
|---|---|---|
| CN | 202540684 | 11/2012 |
| DE | 3516852 | 11/1985 |
| DE | 3730496 | 12/1988 |
| DE | 10223374 | 12/2003 |
| EP | 0169126 | 1/1986 |
| EP | 0326517 | 8/1989 |
| JP | S60259173 A | 12/1985 |
| JP | H07327627 A | 12/1995 |
| JP | H119197 | 1/1999 |
| RU | 2071914 C1 | 1/1997 |
| RU | 2205105 C1 | 5/2003 |

* cited by examiner

EXTRUDER SYSTEM AND METHOD

CROSS-REFERENCE TO RELATED APPLICATION

This application claims priority under 35 U.S.C. 119(e) and 37 C.F.R. 1.78 based upon U.S. Provisional Application Ser. No. 61/789,760 for EXTRUDER SYSTEM AND METHOD filed Mar. 15, 2013, the entirety of which is incorporated herein by reference.

FIELD

The present disclosure relates to extruders and extruded products. More particularly, it is concerned with an extruder system and method having an upstream barrel assembly connected with a satellite extruder assembly including a plurality of extruder barrels, each capable of producing an extruded product having specific characteristics through control of temperature, pressure, and addition of ingredients to a standard extruded material.

BACKGROUND

Various types of extruders have been manufactured that allow for the addition of components to the extrudate, such that the characteristics of the extrudate are altered. These additional components may include colorings, flavorings, texture enhancing components, etc. In current practice, in order to produce extruded products incorporating different colors and flavors, individual runs must be made for each color and/or flavor. This process monopolizes the extruder and the product from each run incorporates the same color and flavor combination determined at the beginning of the run. Where it is desired to manufacture extruded products having different colors, flavors, and textures from a single main feed dough, the feed dough can be divided or separated and mixed with appropriate ingredients and/or additives to achieve the desired color, flavor, and texture combination. During the mixing process the temperature of the feed dough decreases, which affects the texture, density, and viscosity of the extruded product, and can lead to degradation of the product. Further, the act of separating the feed dough into separate streams can require extra drive horsepower to operate the extruder and can create a build up of back pressure.

There have been attempts to add additional components in a cumulative process of repeated extrusions, in which additional components are added during each extrusion. However repeated extrusion results in an increase in the flexibility and elasticity of the starch component of the product, which may be measured by the Storage Modulus. However, the expansion index decreases with repeated extrusion of starches, yielding a heavier product, having an increase in granulate density.

There is a need in the art for an apparatus for creating several products with different characteristics, such as color, flavor, and texture, from one main extruder or one main extrudate stream, and methods of using such an apparatus. Further, there is a need for an apparatus and methods in which the division of extrudate does not cause the problems associated with prior art separation methods, such as the need for additional drive horsepower, the buildup of back pressure, degradation of the product, and loss of ability to control the texture of the product. There is also a need for an extrusion system capable of modulating the processing temperature and texture of various gelatinized products that are manufactured from a single extrudate, as well as a method of modulating cross linking within a starch product.

Extruded starch-containing products are formed by gelatinization of the starch contained in a feed dough, which is forced out of the extruder barrel through a die. Starch is a semicrystalline polymer having a determinable glass-liquid or glass transition temperature ($T_g$). During storage, dry cereal products may undergo textural changes that degrade the quality of the products and shorten their shelf life. Textural changes caused by water migration during storage of dry, starch-containing foods are attributable to the $T_g$ of the food system and $T_g$ is an indicator for predicting the stability of starch-containing foods during storage. Starches that have been gelatinized at lower temperatures are known to exhibit higher levels of crystallinity, and there is an observed relation between crystallinity and $T_g$. Thus, starch crystallinity and the glass transition temperature associated with the gelatinization of cereal starches are determining factors in the quality of dry cereal products. Maximum starch crystallinity is achieved more rapidly during product storage when the starch is gelatinized at lower temperatures. When starch-containing products are produced at reduced processing temperatures, a narrower range of crystallinity is observed throughout product shelf life. Increase in the $T_g$ over the storage life of the product is also reduced when the product is produced at lower processing temperatures. There is a need for management and control of the crystallinity of extruded starch-containing products.

SUMMARY

The present disclosure overcomes the problems inherent in the prior art and provides apparatus and processes for producing multiple extruded products from a single main extruder. The apparatus and methods of the present disclosure provide for production of multiple extruded products without requiring additional horsepower to drive the main extruder screw and without increasing back pressure. Further, the apparatus and processes of the present disclosure provide for modulation of the temperature, pressure, flow rate, viscosity, texture, color, flavor, and amount of material within individual material streams separated from the main material stream of the extruder.

The apparatus provided by the present disclosure includes a satellite extruder assembly which can be attached to conventional extruders known in the art. Generally, the satellite extruder assembly includes a manifold portion and a plurality of satellite extruders. Preferably, a drive motor is attached to each satellite extruder for powering at least one rotatable screw for moving the extrudate through the barrel of the satellite extruder. In preferred forms, a manifold portion of each satellite extruder is capable of receiving a material stream from the main extruder, separating the stream into multiple discrete streams and directing each of these discrete streams into the inlet of a respective satellite extruder. The satellite extruder assembly is preferably removably attached to the main extruder by one or more fasteners such as bolts or the like. Once connected to the main extruder, the manifold is disposed with an inlet in material communication with the outlet of the main extruder barrel and with manifold outlets in material communication with respective inlets of a plurality of satellite extruder barrels. In one preferred embodiment, the satellite extruder assembly may include one, two, three, four, five, six, seven, or eight or more satellite extruders.

A method for manufacturing extruded products with different characteristics from a single main extruder and single extrudate stream is also provided. The method generally includes attaching the satellite extruder assembly of the present disclosure to a conventional main extruder and moving a material stream through the main extruder to form an extruded product or extrudate. This main material stream moves through the barrel of the main extruder by action of a screw and is subjected to predetermined temperature, pressure, and shear conditions designed to produce a product having pre-selected characteristics and properties. When the main material stream reaches the manifold inlet of the satellite extruder assembly, the stream is divided into one or a plurality of streams that are channeled to respective ones of a plurality of satellite extruders. The satellite extruder assembly is connected with the outlet of the main extruder to receive the extrudate from the main extruder. Alternatively, the satellite extruder assembly may be disposed at any selected point along the length of the main extruder barrel such that the material stream may exit the main extruder barrel directly into the manifold of the satellite extruder assembly at such selected point. In this manner, the partially processed material stream or fully processed extrudate of a main extruder can be individually modified and processed in a satellite extruder. Further, the material stream may exit the main extruder at any point along the length of the main extruder barrel into the attached satellite extruder assembly, thereby forming a variety of products having different characteristics.

As can be appreciated, the separate processing afforded by the satellite extruders permits the addition of many ingredients that would degrade, such as temperature sensitive ingredients, during the typical processing which occurs in conventional extruders. The starch can be entirely cooked in the primary extruder, whereupon the extrudate stream exits the primary extruder and enters each respective satellite extruder. Each satellite extruder can then operate under conditions permissible for the addition of these ingredients. Thus, the present disclosure can include lower initial amounts of these ingredients while still providing final bioavailable amounts in the final product that are comparable or greater than those found in conventional products extruded through conventional extruders.

The drawings constitute a part of this specification, include exemplary embodiments of the extruder system and method, and illustrate various objects and features thereof.

DETAILED DESCRIPTION

Figure 1:
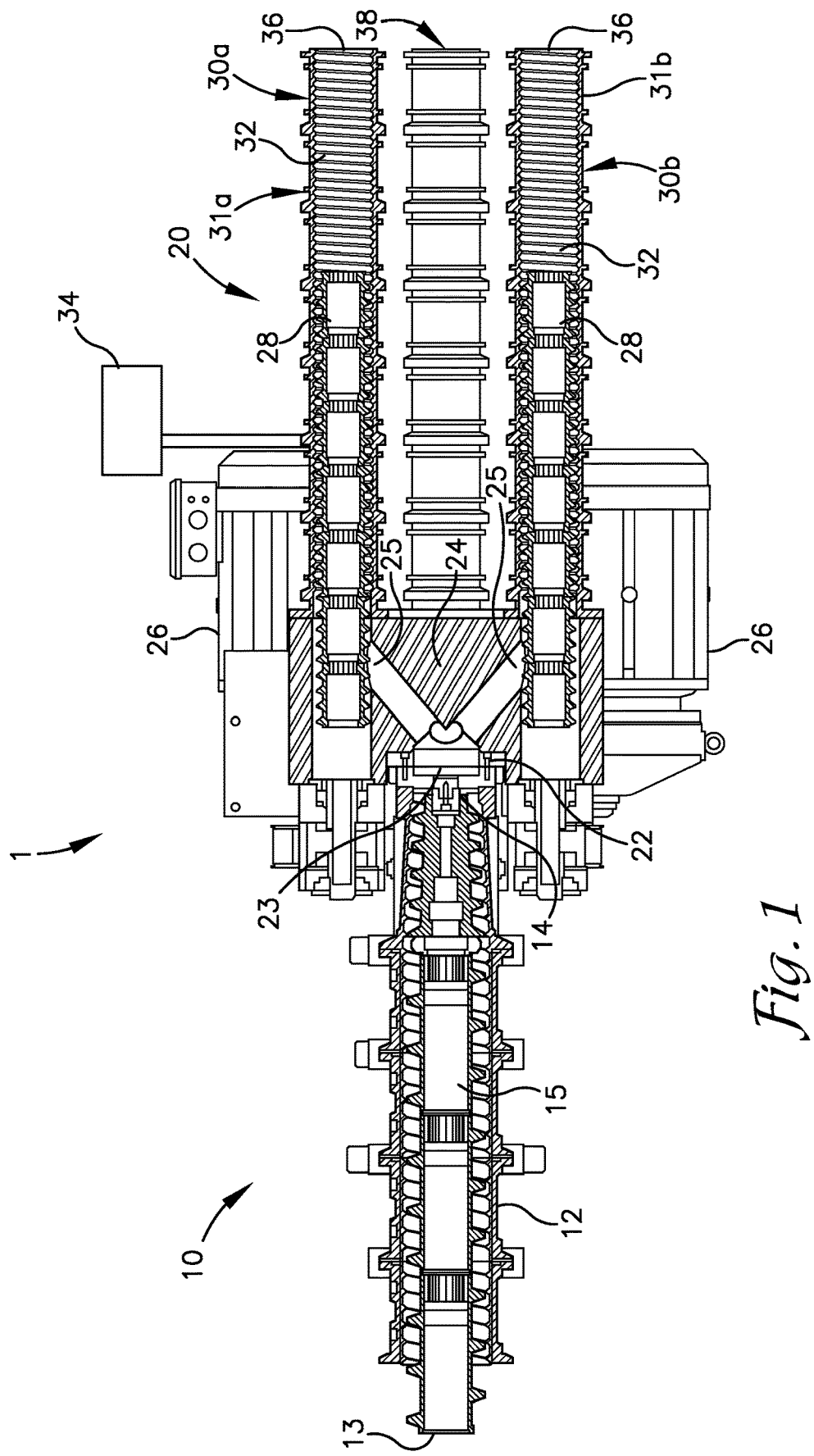
FIG. 1 is a side perspective view of the extrusion device showing a satellite extruder assembly attached to a main extruder assembly.
Figure 2:
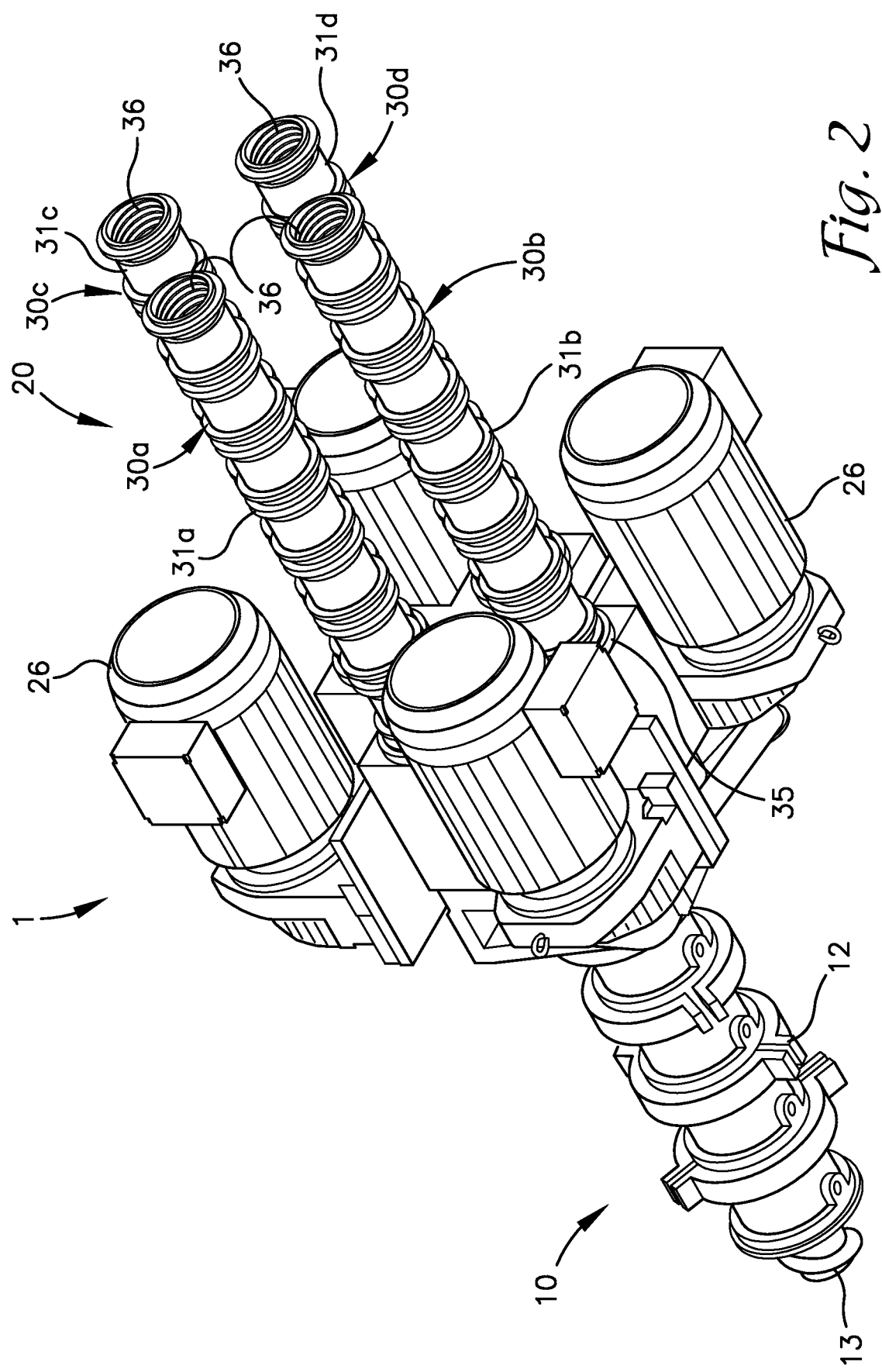
FIG. 2 is a perspective view taken from above toward the output end, showing a satellite extruder assembly coupled with a main extruder assembly.

An extruder system 1 in accordance with the present disclosure is shown in FIGS. 1 and 2 to include a primary or main extruder assembly 10 connected with a downstream satellite extruder assembly 20. The system 1 divides the extrudate of the main extruder 10 into multiple streams for further processing by the satellite extruder assembly 20. Such further processing may include the injection of additives into one or more of the feed streams as well as the performance of additional mixing and extrusion operations at selected temperatures and pressures. In this manner, multiple extrusion products, each having different individual characteristics, may be concurrently produced from a single primary extruder and a single primary extrudate stream.

The main extruder assembly 10 includes a barrel assembly 12 having an inlet 13 and an outlet 14, where an extrudate normally exits the main extruder. The barrel assembly 12 is of conventional construction, and one exemplary barrel assembly is described in U.S. Pat. No. 5,694,833, which is incorporated herein by reference in its entirety. The barrel assembly 12 houses an axially rotatable screw 15. The satellite extruder assembly 20 includes a manifold 24 having an inlet 23 and a plurality of outlets 25, each outlet coupled with one of a plurality of satellite extruders. The embodiment shown in FIG. 2 includes four satellite extruders 30A, 30B, 30C and 30D. Those skilled in the art will appreciate that any appropriate number of satellite extruders may be employed. For example, a main extruder 10 may be connected with one, two, three, four, five, six, seven, eight, nine, ten, fifteen, twenty or any other desired number of satellite extruders. In such embodiments, the manifold 24 may be modified to include a number of outlets 25 corresponding to the number of connected satellite extruders 30A, 30B, 30C, 30D. The manifold 24 is removably connected to the main extruder assembly 10 in a downstream orientation with the barrel outlet 14 in fluidic or material communication with the manifold inlet 23.

The manifold 24 is preferably connected to the main extruder barrel 12 by a plurality of removable fasteners 22, such as bolts or the like, that extend through a flange on the manifold 24. Preferably, the manifold is configured to divide the material steam without the need for extra drive horsepower, without creating scrap, without degrading the product, and without creating a buildup in back pressure. The manifold may divert the material stream into a single satellite extruder or it may divide the material stream and divert the streams into a plurality of separate streams received by a corresponding plurality of satellite extruders.

In one embodiment, each satellite extruder 30A, 30B, 30C and 30D is removably attached to the satellite extruder assembly 20. This enables swapping of the various satellite extruders, reducing the number of satellite extruders to a single satellite extruder, or a configuration of multiple satellite extruders independent of the other satellite extruders. In another aspect, two or more of the satellite extruders may be assembled so that a co-extruded product is produced. Depending on the number of satellite extruders in the assembly, multiple co-extruded products having different characteristics may be produced simultaneously.

It is foreseen that the main extruder barrel 12 may be disengaged from a satellite extruder assembly 20 and connected to a different satellite extruder assembly 20, having a manifold including a different number of outlets 25 and connected to a corresponding number of satellite extruders 30.

The main extruder may be of any extruder type known in the art. This includes, but is not limited to, cold extruders, hot extruders, and extruders that do not include or provide for temperature regulation. In one preferred embodiment, the extruder is of a type that provides for a temperature regulating mechanism and is preferably a hot extruder. The main extruder may also be an extruder capable of extruding any type of material, including, but not limited to, food products, plastics, polymers, ceramics, metals, and combinations thereof. For purposes of the present disclosure, the main extruder is preferably an extruder capable of producing food products, preferably starch-containing food products, and is preferably an extruder designed for starch-containing food products for animals.

The temperature, pressure, and/or shear conditions in the main extruder 10 and satellite extruders 20 can be modulated by any conventional mechanisms known in the art. Examples of mechanisms of temperature regulation include, but are not limited to, traditional barrel heaters, traditional barrel coolers, heat blowers, liquid cooling systems, internal bore cooling, electrical heating, electrical cooling, water cooling systems, and microprocessors incorporating one or more sensitive thermocouples or resistance thermometers.

Each of the satellite extruders 30A, 30B, 30C and 30D includes a separate barrel assembly 31, having an inlet 35, an outlet 36, and an axially rotatable screw 28 housed within the barrel assembly 31. Each satellite extruder also includes a separate drive motor 26 for controlling rotation and forward motion of the screw 28 to move a product stream through a respective barrel 31 toward and through a respective outlet 36. Each satellite extruder barrel assembly 31 also preferably includes an internal mixing chamber 32. Preferably, mixing of the product stream with additional components within each satellite extruder 30 is accomplished by the agitated mixing provided by rotation of the flighted screw 28 within a mixing chamber 32 housed within the barrel assembly 31 of the satellite extruder. Preferably, each satellite extruder can be used to create a product that is unique from the products of other satellite extruders in the assembly.

In one preferred embodiment, a reservoir or holding tank 34 is connected to the barrel assembly 31 to enable storage of additional components to be added to the stream as it is moved along the barrel 31 by the screw 28. Preferably, the additional components have the effect of modifying or changing the characteristics of the extrudate and/or the extruded product. Such additional components may be added to the stream through an inlet or port disposed anywhere along the barrel 31 of the satellite extruder 30. In another aspect, a die assembly may be attached to each satellite extruder 36 at or before the outlet 36 for forming the extrudate into a variety of selected sizes and shapes. It can be appreciated that any type of die known in the art can be attached to the end of each satellite extruder, such that a specific shape of extrudate is formed. Preferably, a different die can be attached to each of the satellite extruders, thus forming a plurality of extrudate shapes and sizes. In other preferred embodiments, two or more extrudate streams can be brought together or combined after being processed in their respective satellite extruders, thereby providing coextruded products.

In an additionally preferred embodiment, a control system having a control unit such as a programmable logic controller (PLC) or other control system, a computer and a user interface, which may be in the form of a control panel, may be connected with the satellite extruder assembly. The control panel may be in communication with a control system that is integrated with either the satellite extruder assembly, separately integrated into each satellite extruder, or integrated with a control system of the main extruder. Preferably, the control panel may be employed by a user to instruct the PLC to modulate the temperature, pressure, shear, speed of flow, amount of extrudate that enters each satellite extruder from the main extruder, the amount and timing of further material components entering into each satellite extruder, as well as other functions affecting the characteristics of the extrudate. The control system may be used to modulate the characteristics of the extrudate in any manner known in the art. Any processing condition parameters that are preferably adjusted through the use of a control system can also be altered in any manner known in the art in connection with the satellite extruder assembly of the present disclosure.

In an embodiment where the control system adjusts the amount of extrudate from the main extruder entering the satellite extruders, the material stream in a single satellite extruder can comprise 0% to 100% of the main extrudate stream from the main extruder. The amount of extrudate flowing into each satellite extruder from the main extruder may or may not be equal to that in each of the other satellite extruders. The flow of extrudate can be modulated by any method known in the art, including, but not limited to, adjusting a gate valve, a flow obstruction pin, a cutter speed, and/or any flow constricting pins or screws. For example, in a four-way satellite extruder assembly, the amount of extrudate may be any percentage amount between 0 and 100%, including but not limited to 0%, 10%, 20%, 30%, 40%, 50%, 60%, 70%, 80%, 90%, and even 100% of the extrudate from the main extruder into each respective satellite extruder.

Preferably, the control system controls and/or adjusts condition parameters and functions of each satellite extruder individually during the flow of the material stream received from the main extruder, such that changes to the characteristics of the extrudate stream in any one of the satellite extruders can be made, either by a user via a user interface, or via a computer-readable program at any time. Preferably, using the satellite extruder assembly of the present disclosure, changes can be made to the characteristics of the extrudate at any time during the run of a material stream in each satellite extruder without creating scrap, creating the need for extra drive horsepower, degrading the product, or creating a buildup in back pressure. A vacuum system may also be used within one or more of the satellite extruders and this vacuum system may also be modulated by the control system.

Each satellite extruder may be individually configured or designed such that it may or may not continue the extrusion process started in the main extruder. Alternatively, each satellite extruder can be individually configured or designed to subject the extrudate received from the main extruder to extrusion processes and condition parameters that differ from those in the main extruder as well as from the other satellite extruders. Thus, extrudate moving through a satellite extruder may be exposed to higher or lower temperature, shear, and/or pressure conditions. However, exposure to temperature and pressure within the satellite extruder may also be residual from that of the main extruder.

The method of the present disclosure includes providing a quantity of ingredients to a main extruder assembly 10 where a flighted axially rotating screw disposed in the extruder barrel 12 mixes the ingredients into a product mixture or dough which it urges toward and through the outlet 14. The extruded mixture enters the manifold inlet 23, is divided by the manifold into a predetermined number of streams, the number being determined by the structure of the manifold 24, and the feed streams are urged through the manifold outlets 25. The discrete streams pass from the manifold outlets 25 and into respective satellite extruder barrel inlets 35. Respective drive motors 26 drive respective flighted, axially rotating screws 28 to urge the streams through their respective satellite barrels 31A, 31B, 31C and 31D. Additional product components including but not limited to colorants, flavorants, texture enhancers, lubricants, emulsifiers, moisture, additional food components, pH altering agents, aromatics, nutrients, nutraceuticals, pharmaceuticals, medicated components, vitamins and/or minerals active microbiologicals, other additives and various combinations thereof may be selectively added to one or more of the streams in order to modify or change the characteristics of the stream and/or the extruded product. Such further components may be stored in a separate reservoir or holding tank 34 disposed adjacent the satellite extruder assembly 20. In one embodiment, the selected additional components are mixed with the extrudate in agitated mixing fashion by forward rotation of the respective helical flighted screws 28 within the respective barrels 31. The respective streams in barrels 31A, 31B, 31C and 31D may be passed through one or more die assemblies 38 disposed within the respective extruder barrels 31 and/or adjacent the respective outlets 36 in order to form the dough into a desired shape and size.

Alternatively or additionally, each satellite extruder can manipulate the physical characteristics of its extrudate by adjusting conditions in the satellite extruder, particularly those related to temperature, pressure, and shear. Preferably, additional components are added to the extrudate in each satellite extruder by means of a separate component addition mechanism. These separate mechanisms may include separate mixing chambers. It is preferred that each mixing chamber includes a screw or other mixing mechanism driven by a separate motor. These separate motors driving each of the mixing chambers are preferably separate from the drive motor of the main extruder screw. The separate mixing chambers may include any type of reservoir or holding tank that can be attached to the satellite extruder. The attached chambers are disposed to enable the additional components to contact the material stream as it moves through the satellite extruder barrel.

If desired, the feed stream in any one or more of the satellite extruders 30A, 30B, 30C, 30D may be processed and extruded independently of the other satellite extruders. Thus, the present disclosure provides the capability of producing multiple distinct extruded products from a single main extrudate stream after it has been divided into multiple extrudate streams.

If desired, one or more of the extruded product streams may be subject to one or more drying and/or other finishing steps in a dryer or finisher apparatus to form finished products ready for packaging. In one aspect the distinct extruded products from each satellite extruder may be individually dried and/or finished in separate apparatus and/or following separate method steps under selected temperature and/or other conditions. Alternatively, the distinct extruded product streams from one or more of the satellite extruders may be combined or pooled for drying and/or finishing steps, each step performed in an apparatus under the same selected temperature and/or other conditions. In one aspect, one or more of the extruded product streams may be discharged as scrap.

Advantageously, this two stage-method of processing a feed stream in a main extruder 10, followed by additional processing in a satellite extruder 30A, 30B, 30C or 30D enables operation of each of the extruders at different temperatures and shears. Since starch-containing mixtures gelatinize at relatively high temperatures, the main extruder 10 may be operated at temperatures and shears that are higher than the temperature and shear of the satellite extruders. Alternatively, temperatures and shear may be elevated in one or more of the satellite extruders. The ability to independently control the energy imparted in each extruder allows for differentiated shear levels to be imparted to a single extrusion mix to allow the mix to be manufactured into a variety of products having very different properties. Products produced using the disclosed method may differ in texture expansion as well as the included ingredients. Co-extruded products may be produced on any one satellite extruder, while single component products are produced on other satellite extruders.

Dual processing by a primary extruder followed by processing by a satellite extruder results in increased overall processing time, while allowing reduction of temperature during the satellite extrusion portion of the process. In this manner, the starch-containing components can be gelatinized at relatively high temperature in the primary extruder for a short period of time, and then temperatures may be reduced in the satellite extruders for longer additional processing times. The longer overall processing time at lower temperature results in reduced production of certain microbial and toxicological contaminants, which improves the quality of the final extruded products. Some studies have indicated that prolonged cooking of animal foods at lower temperatures may result in increased animal glucose absorption when such foods are eaten.

In one preferred embodiment, humectants, oils, fats and the like, which typically bind water and make it more difficult for starch granules to achieve hydration and swelling during extrusion, are reserved. These hydration-competitive components are separated from other feed dough components which are processed in the main extruder assembly 10 until gelatinization has been achieved. The hydration-competitive components are introduced later into the satellite extruder barrels 31. In this manner, starch components of the feed dough in the main extruder barrel 12 may achieve maximum hydration and gelatinization without inhibition by competitive components.

In another preferred embodiment, shear sensitive ingredients such as vitamins and active microbiologicals, that may be damaged or denatured by elevated processing temperatures are reserved from the feed stream of the main extruder 10, and are introduced downstream into one or more of the satellite extruders 30A, 30B, 30C and/or 30D.

In another preferred embodiment, the satellite screws are operated at a higher rate of speed than the primary extruder 10. This maximizes the processing efficiency of the primary extruder because it is not urging the stream directly against a forming die, but rather into the manifold and satellite extruders, which diversifies the force across a plurality of dies. This reduces back pressure on the primary extruder. In addition, operating the satellite screws at a higher rate of speed serves to increase the output of the primary extruder system.

It is to be understood that while certain forms of the extruder system and method have been illustrated and described herein, the invention is not to be limited to the specific forms or arrangement of parts described and shown. Having thus described preferred embodiments, the following is claimed as new and desired to be secured by Letters Patent:

We claim:

1. A method of increasing starch gelatinization in a starch-containing pet food product, comprising the steps of:
    providing a multi-extrusion apparatus including:
        a primary extruder and a plurality of satellite extruders, each extruder having an axially rotatable screw within a barrel and configured to move material from a barrel inlet, through the barrel, and out through a barrel outlet, and
        a manifold connected to the primary extruder and the plurality of satellite extruders having an inlet and a plurality of separate outlets and operable to separate said material passing through the barrel outlet of said primary extruder into a plurality of separate material streams, each stream passing through one of said manifold outlets and into an inlet of one of the satellite extruders;

processing a starch-containing pet food mixture by extrusion through the primary extruder at a first temperature and first shear conditions, wherein the starch-containing pet food mixture does not include a hydration competitive components or a temperature or shear sensitive ingredient;

next passing the extruded starch-containing mixture through the manifold to form a plurality of separate material streams and directing each of the streams to an inlet of one of the satellite extruders;

adding a hydration competitive component and a temperature or shear sensitive ingredient to at least one of the satellite extruders and not to the primary extruder; and processing the material streams, the hydration competitive component, and the temperature or shear sensitive ingredient by extrusion through the at least one of the satellite extruders at a second temperature that is lower than the first temperature and the second shear conditions that are lower than the first shear conditions;

wherein the bioavailability of the shear or temperature sensitive ingredient is increased in the final extrusion product in comparison to final extrusion products processed in a single extruder.

2. The method of claim 1, further including the steps of:
operating the extruder screw of the primary extruder at a rate of speed; and
operating at least one of the extruder screws from one of the satellite extruders at a rate of speed that is lower than the rate of speed of the extruder screw of the primary extruder.

3. The method of claim 1 further including the step of:
subjecting the extruded food products to a further step of drying by transferring the plurality of products extruded from the satellite extruders to a dryer.

4. The method of claim 1, wherein the hydration competitive component is selected from humectants, oils, fats, and combinations thereof.

5. The method of claim 1, wherein the shear or temperature sensitive ingredient is selected from vitamins, active microbiologicals, and combinations thereof.

* * * * *